Sept. 29, 1925.
E. R. BURTNETT
INTERNAL COMBUSTION ENGINE
Filed Sept. 25, 1924
1,555,808
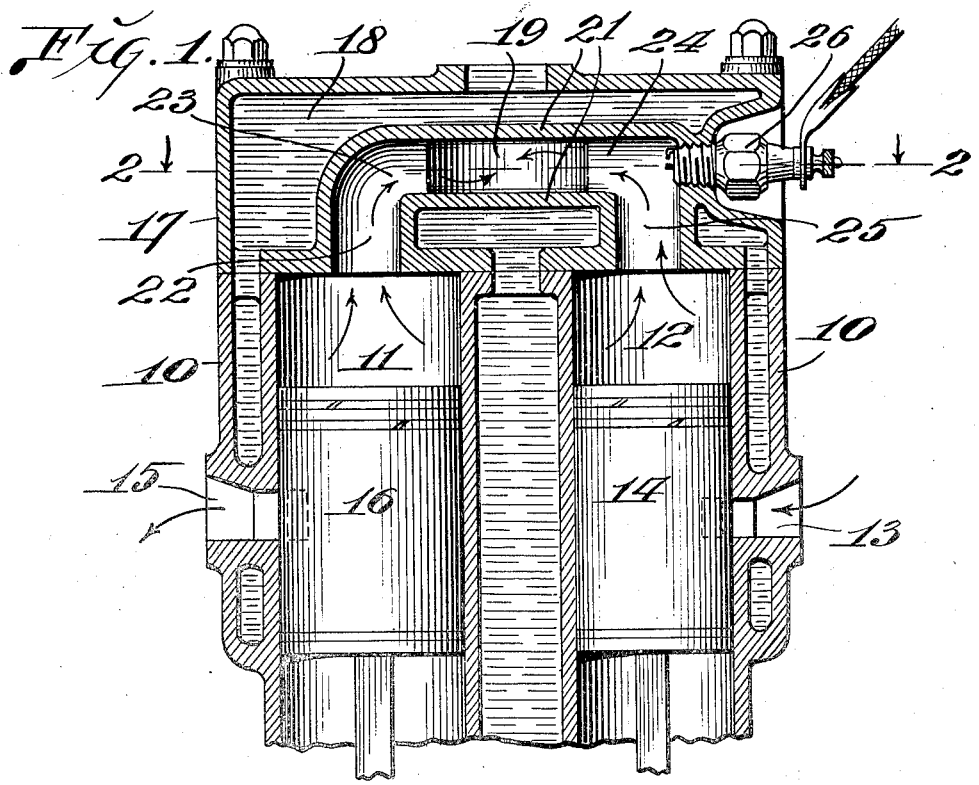
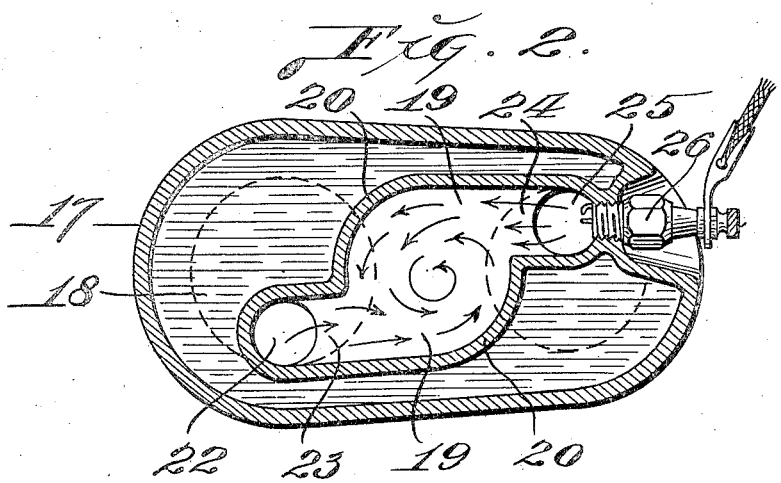

Patented Sept. 29, 1925.

1,555,808

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed September 25, 1924. Serial No. 739,916.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates to internal combustion engines that operate on the two stroke cycle principle, the principal object of my invention being to provide in the head of the engine a combined compression and combustion chamber that functions as a common clearance space for two combustion cylinders and within which common clearance space the combined residual and fresh gaseous fuel charge is caused to be highly agitated, thereby effecting a thorough and intimate mixture of said residual and fresh gaseous fuel throughout the compression stroke of the pistons within the two cylinders.

Inasmuch as the clearance space within the head is common to the two combustion cylinders, the forcing of the compressed charge of residual and fresh gases into said clearance chamber produces a high degree of turbulence within said common chamber, and as a result of such condition the rapidity of flame propagation through the entire fuel charge after ignition will be materially increased and, further, the thorough mixture of the residual products of combustion and fresh fuel gases will tend to decrease combustion temperatures and, consequently, reduce the tendency of the charge to detonate.

To accomplish the desired results, I form within the head block of the engine a chamber that has a substantially circular side wall and flat parallel top and bottom walls and the space within said chamber is connected by tangentially disposed ducts or passageways with the combustion chambers of the engine, there being an ignition device located at the end of the tangential duct that communicates with the combustion chamber to which the fresh gaseous fuel charge is inducted. This arrangement accomplishes a satisfactory and uniform firing of the fuel charge at all times, regardless of load or gaseous fuel mixture ratio to the volume of residual gases remaining in the combined combustion cylinders and clearance as an initial charge volume. Since the relatively small quantity of fresh gaseous fuel needed for idling or for light load operation will be inducted and remain in a stratum directly over the piston of the cylinder in which the inlet ports are located, and as said small quantity of gaseous fuel will not reach the vicinity of the clearance chamber where the charge is being agitated until the very end of the compression stroke and at the time of ignition of the gaseous fuel charge, the flow of clean gaseous fuel will be undiluted by the relative great volume of residual gases remaining in the cylinder at light loads and will pass directly across the ignition device that is located at the opening between the cylinder having the inlet ports and the common clearance chamber.

When the engine load is increased and any appreciable volume of fresh fuel is inducted in proper ratio to the residual volume, the gaseous mixture excepting the small quantity located directly over the piston within the chamber having the fuel inlet ports will enter the clearance chamber as early, during the compression stroke of the pistons, as the ratio of inducted charge of gaseous fuel is in volume to the total piston displacement. Hence, as the engine load is increased and the gaseous fuel charge volume increases, a relative and properly proportioned increase and mixture of the gaseous fuel with the residual gases will be produced in the common clearance and combustion chamber.

My present invention is an improvement on the subject matter disclosed in my copending patent applications filed July 31, 1924, Serial No. 739,300, and Sept. 25, 1924, Serial No. 729,914.

With the foregoing and other objects in view, my invention consists in the features of construction and combination and arrangements of parts hereinafter more fully described and claimed, reference being had to the accompanying drawings, in which Figure 1 is a vertical longitudinal section taken through the center of a pair of combustion cylinders of an engine showing the head block thereof provided with a turbulence chamber as contemplated by my invention;

Figure 2 is a horizontal section taken on the line 2—2 of Figure 1.

Referring by numerals to the accompanying drawings, 10 designates an engine cylinder block, 11 and 12 a pair of combustion chambers within said block, 13 gaseous fuel inlet ports that lead into the combustion chamber 12 and which are uncovered and open during the time that the piston 14 within said chamber 12 passes low center, and 15 exhaust ports that are formed in the wall of cylinder block surrounding the combustion chamber 11 and which exhaust ports are uncovered and open only when piston 16 that operates within said chamber 11 passes low or outer dead center.

Secured on the head end of block 10 is a head block 17 having a chamber 18 or a series of connected chambers through which a fluid cooling medium such as water may be circulated, and formed in the central portion of this head block is a turbulence chamber 19 that has a substantially circular side wall 20 and flat parallel top and bottom walls 21. Thus said turbulence chamber 19 occupies a substantially horizontal position within the center of block 17 where it is entirely surrounded by the cooling medium that passes through chamber 18.

Leading upwardly from combustion chamber 11 and at one side of the axis thereof is a short throat or duct 22, and the upper end thereof communicates directly with a short tangentially disposed duct 23 that communicates directly with one side of the turbulence chamber 19. Leading from turbulence chamber 19 and oppositely arranged relative to duct 23 is a tangentially disposed duct 24 that communicates directly with the upper end of a short throat or duct 25, the lower end of which communicates directly with the upper end of combustion chamber 12. Thus centrally arranged turbulence chamber 19 and ducts 22 and 23, and 24 and 25, constitutes a common clearance compression and ignition chamber for the combustion chambers 11 and 12, and such chamber 19, being disposed at a central point between said combustion chambers provides a turbulence chamber in which the fresh gaseous fuel charges admitted to chamber 12 are thoroughly mixed and commingled with the residual products of combustion that remain in chamber 12 after the combustion of each compressed gaseous fuel charge.

Seated in head 17 and preferably at the outer end of duct 24 and at the upper end of duct 25 is an ignition device, such as a spark plug 26, the terminals of the electrodes of which project into the outer end of said duct 24.

In the operation of my improved engine, pistons 14 and 16 in passing low or outer center uncover inlet ports 13 and exhaust ports 15, and as said ports are thus uncovered a gaseous fuel charge under pressure enters ports 13 and passes upward through chamber 12. From this chamber said fresh gaseous fuel charge passes through ducts 25 and 24 into turbulence chamber 19 and from the latter said gaseous fuel charge passes through ducts 23 and 22 into and downward through combustion chamber 11, and in so doing said gaseous fuel charge will drive before it a substantial portion of the products of combustion remaining in the combustion chambers and turbulence chamber from the previously ignited charge, and this substantial portion of the products of combustion will be driven out through exhaust ports 15.

As pistons 14 and 16 start on their upward or inward travel, ports 13 and 15 will be closed and on the continued upward movement of said pistons the inducted gaseous fuel charge and the residual products of combustion will be forced though ducts 22 and 23, and 24 and 25, into the turbulence chamber, and due to the tangential arrangement of ducts 23 and 24 said fresh gaseous fuel and residual products of combustion will be given a whirling movement within the turbulence chamber 19, thereby effecting a very thorough mixture of said fresh fuel and residual products of combustion. This state of turbulence and agitation increases as the pistons approach high center or the point of highest compression, and when this point is reached or as the pistons pass high center, a spark is produced between the terminals of the electrodes of spark plug 26, thereby igniting the intimate mixture of gaseous fuel and residual products of combustion. This ignition, occurring during the relatively high degree of turbulence of the charge mixture, will result in rapid flame propagation through the fuel mixture and the rapid rise in pressure following ignition and combustion of the charge will be directed against the heads of pistons 14 and 16 to drive the same downward or outward on their power stroke.

Inasmuch as the inducted gaseous fuel is thoroughly and intimately mixed with the residual products of combustion through the action of turbulence within chamber 19, the flame propagation through the entire fuel charge after ignition will take place with great rapidity and as the residual products of combustion absorb a certain amount of heat resulting from combustion of the fresh gaseous fuel, a substantial decrease in combustion temperatures is effected, thereby tending to eliminate and minimize the undesirable results arising from detonation.

Obviously the construction of the engine and its turbulence head as herein illustrated and described may be changed in various minor details without departing from the spirit of my invention, the scope of which is set forth in the appended claims.

I claim as my invention:

1. An internal combustion engine having a pair of combustion chambers, one of which is provided with a gaseous fuel inlet port and the other chamber being provided with an exhaust port, a head closing said chambers, said head being provided with a substantially disc-shaped turbulence chamber that occupies a horizontal plane within the central portion of said head and ducts formed in said head for establishing communication between the respective combustion chambers and said turbulence chamber.

2. An internal combustion engine having a pair of combustion chambers, one of which is provided with a gaseous fuel inlet port and the other chamber being provided with an exhaust port, a head closing said chamber, said head being provided with a substantially disc-shaped turbulence chamber that occupies a horizontal plane within the central portion of said head, and ducts formed in said head for establishing communication between the respective combustion chambers and said turbulence chamber, portions of which ducts are tangent to the circumferential portion of the disc-shaped turbulence chamber.

3. An internal combustion engine having a pair of combustion chambers, one of which is provided with a gaseous fuel inlet port and the other chamber being provided with an exhaust port, a head closing said chambers, said head being provided with a substantialy disc-shaped turbulence chamber that occupies a horizontal plane within the central portion of said head, ducts formed in said head for establishing comunication between the respective combustion chambers and said turbulence chamber, and an ignition device seated in the head and projecting into the duct that leads from the combustion chamber having the gaseous fuel inlet ports to said turbulence chamber.

4. An internal combustion chamber having a pair of combustion chambers, one of which is provided with a gaseous fuel inlet port and the other chamber being provided with an exhaust port, a head closing said chamber, said head being provided with a substantially disc-shaped turbulence chamber that occupies a horizontal plane within the central portion of said head, ducts formed in said head for establishing communication between the respective combustion chambers and said turbulence chamber, portions of which are tangent to the circumferential portion of the disc-shaped turbulence chamber, and an ignition device seated in the head and projecting into the duct that leads from the combustion chamber having the gaseous fuel inlet ports to said turbulence chamber.

In testimony whereof I affix my signature.

EVERETT R. BURTNETT.